(12) United States Patent
Venkatakrishnan (10) Patent No.: US 12,050,897 B2
(45) Date of Patent: Jul. 30, 2024

(54) CONTROLLED ROLLOUTS FOR FRONTEND ASSETS

(71) Applicant: Bolt Financial, Inc., San Francisco, CA (US)

(72) Inventor: Roopak Venkatakrishnan, Daly City, CA (US)

(73) Assignee: Bolt Financial, Inc., San Francisco, CA (US)

( * ) Notice: Subject to any disclaimer, the term of this patent is extended or adjusted under 35 U.S.C. 154(b) by 23 days.

(21) Appl. No.: 17/387,873

(22) Filed: Jul. 28, 2021

(65) Prior Publication Data

US 2022/0035622 A1 Feb. 3, 2022

Related U.S. Application Data

(60) Provisional application No. 63/058,903, filed on Jul. 30, 2020.

(51) Int. Cl.
*G06F 8/65* (2018.01)
*G06Q 20/08* (2012.01)
*H04L 67/00* (2022.01)

(52) U.S. Cl.
CPC .............. *G06F 8/65* (2013.01); *G06Q 20/085* (2013.01); *H04L 67/34* (2013.01)

(58) Field of Classification Search
CPC .......... G06Q 20/085; G06F 8/65; H04L 67/34
See application file for complete search history.

(56) References Cited

U.S. PATENT DOCUMENTS

| | | | |
|---|---|---|---|
| 8,751,661 B1* | 6/2014 | Young | H04L 67/1008 709/219 |
| 9,521,087 B1* | 12/2016 | Krikellas | G06F 16/219 |
| 10,521,220 B1* | 12/2019 | Hickman | G06F 8/65 |
| 2014/0317289 A1* | 10/2014 | Shahpurwala | H04L 67/02 709/225 |
| 2016/0335079 A1* | 11/2016 | Tammam | G06F 8/656 |
| 2019/0227903 A1* | 7/2019 | Sundaresan | G06F 11/3438 |
| 2019/0294428 A1* | 9/2019 | Scheiner | H04L 67/34 |
| 2020/0183988 A1* | 6/2020 | Vasthimal | G06F 11/3447 |
| 2021/0192550 A1* | 6/2021 | Tang | G06F 9/541 |

* cited by examiner

*Primary Examiner* — S. Sough
*Assistant Examiner* — Cheneca Smith
(74) *Attorney, Agent, or Firm* — Baker Botts L.L.P.

(57) ABSTRACT

In one embodiment, a method for providing assets from an asset origin to client devices includes receiving, by a computing system, a request to access a frontend asset from a first client device of the client devices. The method includes determining, by the computing system, an asset selection criteria. The method includes modifying, by the computing system through a dynamic function based on the asset selection criteria, a request for the asset origin to select a particular asset from multiple assets that are responsive to the request to access the frontend asset. The method includes causing, by the computing system, the asset origin to provide the particular asset to the first client device by providing the modified request to the asset origin.

20 Claims, 10 Drawing Sheets

CONTROLLED ROLLOUTS FOR FRONTEND ASSETS

PRIORITY

This application claims the benefit, under 35 U.S.C. § 119(e), of U.S. Provisional Patent Application No. 63/058,903, filed 30 Jul. 2020, which is incorporated herein by reference.

BACKGROUND

Assets for web applications are often served on demand by a content-delivery network (CDN). When serving frontend assets for web applications, which are used by customers or other third parties through a client device, rolling out a new version usually involves swapping out the current version being served by the CDN with a new one and forcing a clearing of the cache on the client device. This process leaves gaps in terms of processes such as rollout, testing, and debugging. This is particularly the case when the produced frontend assets are loaded by client devices and the product server acts as a CDN.

Specifically, in the case of rollouts, it is not presently possible to support a controlled rollout of new assets, such as blue-green deployment or canary deployment (e.g., where new assets are first rolled out to 10% of the devices using a particular build and, upon verification, the new assets are later rolled out to the remaining 90%). While this sort of rollout strategy is possible with backend services, which are tightly controlled by product providers, this rollout strategy has not been possible with frontend assets.

Similar gaps are left by present processes in testing and debugging environments as it is not possible to serve a custom asset solely and specifically to an engineer who wants to debug some facet of the product, or to other specialized users with specialized use cases. Approaches such as service meshes are sometimes used in the case of backend services to attempt to remedy this deficiency of current techniques by allowing traffic to be routed to specific backend instances. However, as described, such an approach is not feasible for frontend services.

SUMMARY OF PARTICULAR EMBODIMENTS

This disclosure describes a new mechanism for serving frontend assets which allows for controlled rollouts of the assets to a variety of subsets of clients (e.g., client devices). Furthermore, the new mechanism facilitates advanced and targeted beta-testing capabilities for frontend assets.

Throughout this disclosure, the following definitions may be used for the following terms. An "asset" can refer, for example, to JAVASCRIPT, CSS, HTML, images or other media that serve a website frontend. Assets are typically served via a server computing device of a content-delivery network (CDN). Throughout this disclosure, in the context of assets and rolling out new versions (e.g., "versioning"), the following terminology may be used to describe different versions. "Current" may refer to a stable version of the assets being served. "New" may refer to the "next" version (e.g., candidate version) of the asset which is being considered for rollout or attempted to be rolled-out. "Beta" refers to a version of the asset desired to be tested with a subset of possible clients and users. A beta version of an asset can later become the "new" version upon successful validation. "Non-live" refers to any version of the asset that is not being served or is not the candidate version.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Particular embodiments disclosed herein may be designed to address specific problems or omissions in the current state of the art. For example, as described herein, current approaches for delivering frontend assets fail to provide several features that are useful in software engineering and test. These features include supporting controlled rollouts of new assets, testing through limited subsets of users, and debugging through deployment of assets to particular users (e.g., the developers).

Particular embodiments disclosed herein may be implemented using one or more example architectures.

CDNs often allow provider systems (e.g., users of the CDN attempting to deliver content on-demand to clients) to run a JAVASCRIPT function and change the request before the request is forwarded to the origin. For example, a server computing device (or an application instance executing thereon) of a provider system may mediate the exchanges between user client devices and server computing devices of the CDN (or corresponding application instances executing thereon). This request may have various names depending on the CDN. As an example, this request may be referred to as an origin request lambda for the CLOUDFRONT CDN and may be referred to as an edge worker for the CLOUDFLARE CDN. As described herein, this function can be used to add controlled rollout and beta-testing capabilities for frontend assets. Although examples provided in this disclosure are provided using CLOUDFRONT and the viewer and origin request lambda functions, it is understood that the techniques described herein can be applied to any suitable CDN with appropriate adjustments.

In particular embodiments, every request that is received by the CDN or the provider interfacing with the CDN (e.g., by a server computing device or by an application instance) first invokes the viewer request lambda (or origin request lambda if the object is not cached). The lambda is where the main decision and logic happens. At that decision point, either the current version of an asset is served, or another version of the asset is served.

To determine whether to serve a non-live version of the asset, the lambda is modifies the request before forwarding the request to the origin. The modification may consider one or more conditions before requesting the asset that is to be served. In particular embodiments, the request call may be made with a header that specifically requests a specified version of the asset (e.g., used for debugging). In particular embodiments, a percentage of traffic may be directed to a new version of the asset, for example, during a controlled rollout. The percentage of traffic that is directed to the new version may be increased over time as the new version is validated or confirmed to be functional. As an example, this decision may be made using a random generator and by selecting the user (e.g., client device) for a specific bucket that corresponds to which version of an asset is to be provided to the client device. Once a client device is selected for a specific bucket, device cookies may be used to keep the user in that bucket so that the user's status during the rollout is preserved. Cookie expiry can be set based on the terms of the rollout to manage whether the asset is either reverted or a different version is to be used. In particular embodiments, custom logic can be used for beta requests where the decision on which asset to use version is made via other means such as client device cookies, device sessions, the origin header, etc.

After the determination is made through the lambda call regarding which version to serve the user, that version may be fetched from the origin and returned to the client device. To the client device, the request for the asset will appear as if it just received the live version of the asset. However, a different version could have been fetched and served to the client in the background without any extra steps from the user. This creates a seamless experience for the end user with a minimal overhead of additional computational resources that will be used to determine the version of the asset to serve to each client device in a centrally-controlled manner. Thus, the techniques disclosed herein relate to systems and methods to improve the operation of devices used in and with CDNs and associated products that deliver asserts to client devices on-demand.

Particular embodiments disclosed herein may be implemented using one or more example processes.

Figure 1:
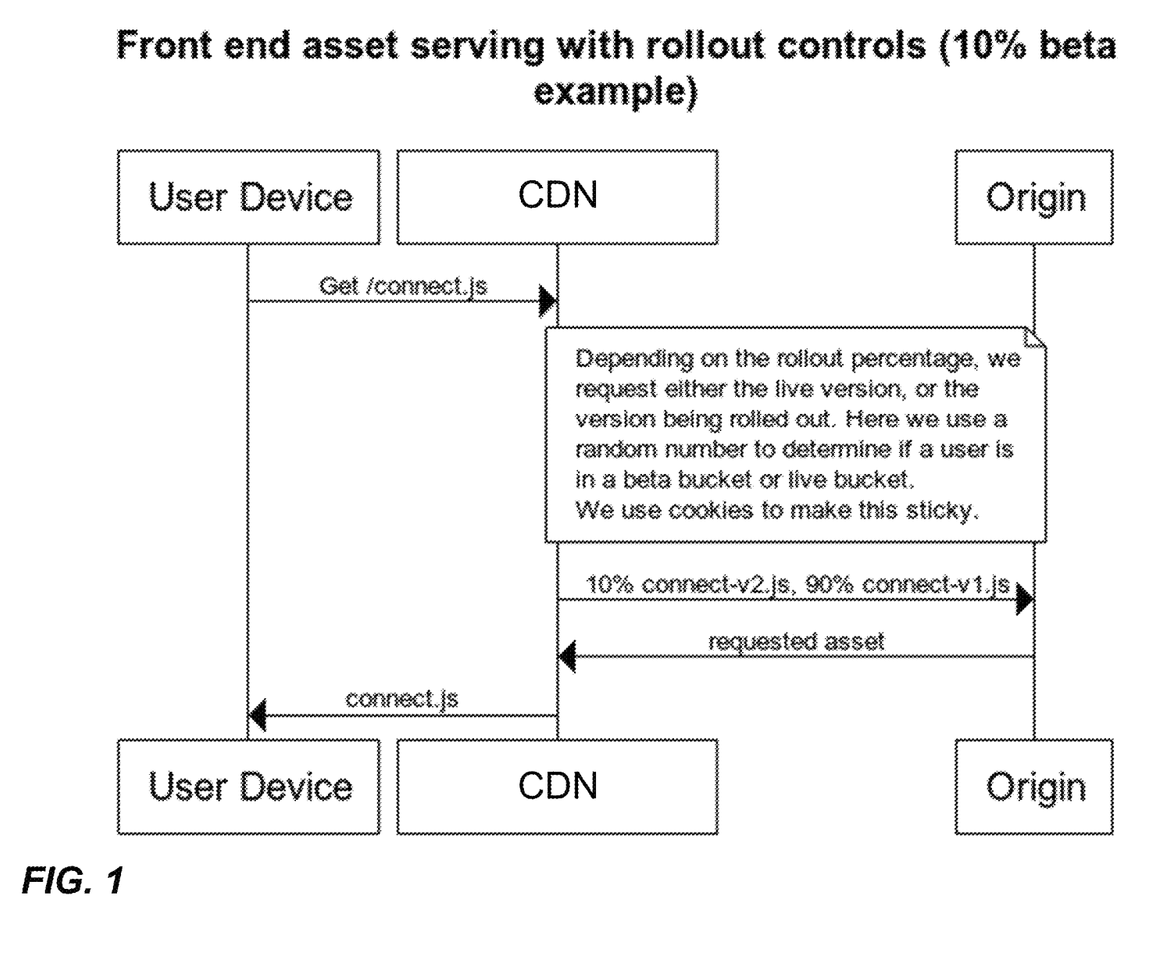
FIG. 1 illustrates a sequence diagram showing a frontend asset rollout workflow according to embodiments disclosed herein.

FIG. 1 illustrates a sequence diagram showing a workflow involving serving 10% of asset requests (in this case for a "connect.js") as "v2" (e.g., a new version of a particular asset), while the rest go to "v1" (e.g., the live version of the particular asset). Once the request reaches a CDN, the request retrieves v2 in 10% of client requests and retrieves v1 in the remaining 90% of cases as instructed by the origin lambda function. As an example, the origin lambda function in this case assigns 10% of all client devices to a bucket corresponding to v2. As another example, the origin lambda randomly assigns 10% of all client device requests to a bucket corresponding to v2. Although the example includes 10% of all client devices, any suitable percentage can be used. When responding to the user, the selected asset is served as normal. The server and client do not distinguish between v1 or v2 once the proper version has been identified. As an example only and not by way of limitation, an origin could be an AMAZON WEB SERVICE ("AWS") SIMPLE STORAGE SERVICE ("S3"). Various other systems could be used as an origin. If the client device has already been assigned to a bucket corresponding to either v1 or v2, the client device can be made to store a device cookie indicating the assignment to a particular bucket. The origin lambda function can first check for the existence of said device cookie prior to, e.g., randomly assigning the client device to a bucket. This allows the determination of whether a device is in v1 or v2 to be sticky and be maintained locally with minimal additional use of computational resources.

Figure 2:
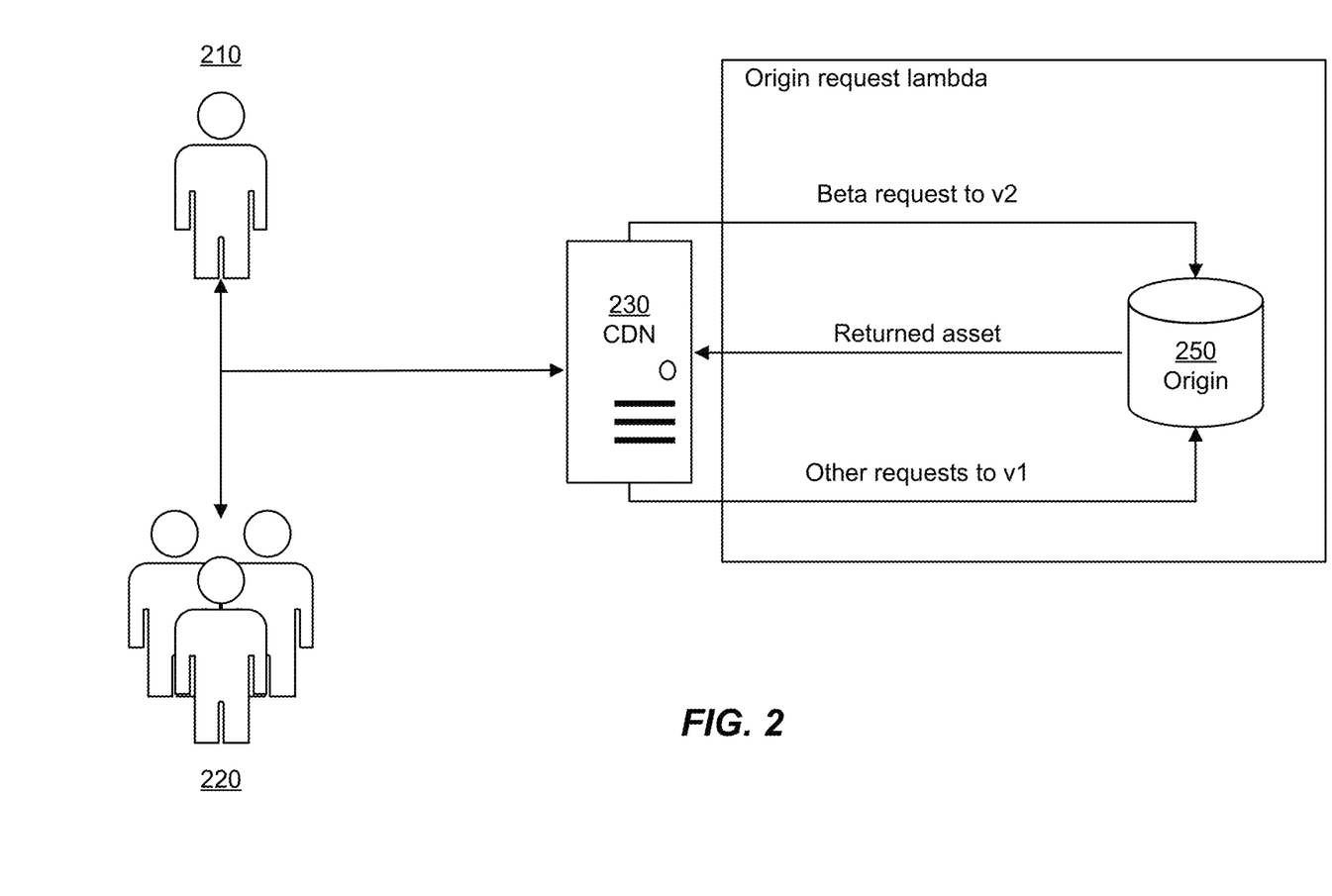
FIG. 2 illustrates an example workflow according to embodiments disclosed herein.

FIG. 2 illustrates a workflow for how, if a particular user is determined to be a beta user 210 (e.g., their client device is selected or designated to be a beta device), their request is appropriately modified by the CDN 230 before retrieving an appropriate asset from an origin 240 holding the assets. The request is automatically modified directly to retrieve v2 assets from the origin 240. For other users, such as users in the general population 220 (e.g., users whose devices have not been selected or designated as a beta device) device requests are sent to retrieve v1 assets from the origin 240.

Particular embodiments disclosed herein may be implemented in relation to different example use cases. Provided in detail in this disclosure are three exemplary use cases of controlled rollouts: (1) controlled rollouts of new versions of assets subject to validation; (2) beta versions of assets; (3) debugging particular versions of assets. Although these use cases are described in detail herein, the techniques described herein can be adapted to other suitable use cases as will be apparent to those of skill in the art.

The workflow of the system in the embodiment of controlled rollouts of new versions of assets will now be described. In particular embodiments, in the starting state, an asset bucket (e.g., an AWS S3 bucket) contains a file which holds current serving information. Since origin request lambda functions do not allow environment variables, the function instead reads a rollout configuration file that contains the needed information. Depending on caching requirements, this configuration file can be read as needed. Data that may be stored in the file may include, for example, the current version of an asset (e.g., the version hosted or stored by the CDN), the rollout version of the asset (e.g., the next targeted version that is being rolled out according to the rollout plan), a rollout percentage (e.g., the percentage of users who should be included in the rollout), other user selection criteria, other asset selection criteria, or other similar information. As example specification of a rollout file includes:

```
{
    "CURRENT_VERSION": "v2345",
    "ROLLOUT_VERSION": "v2346"
    "ROLLOUT_PERCENTAGE": 25
}
```

Using this example rollout configuration file, the rollout version (e.g., a non-live version of the asset) is served in 25% of the cases, and the current version of the asset is served in all other cases. User assignment to a particular bucket may be persisted using cookies. In particular embodiments, to increase the rollout percentage, the system may update the rollout file on the asset bucket from which the origin request lambda reads. In the bucket, instead of having one target asset (e.g., "connect.js"), the bucket has several options for that asset (e.g., "connect_v2345.js" and "connect_v2346.js"). Therefore, the file that is returned on each request for the asset is determined by the lambda.

For every request, the origin request lambda function may proceed through decision logic for a function assignVersion( ) similar to that expressed in following pseudocode:

```
assignVersion( ) {
    userInABucket = isUserInABucket( )
    rolloutInfo = getRolloutConfigFromBucket( )
    if (!userInABucket) {
        assignUserToABucket(rolloutInfo.ROLLOUT_PERCENTAGE)
    }
    if (userInRolloutBucket( )) {
        serveVersion(rolloutInfo.ROLLOUT_VERSION)
        } else {
        serveVersion(rolloutInfo.CURRENT_VERSION)
        }
}
```

Through the decision logic, the origin request lambda function determines first if the client device issuing the request is already assigned to a particular content bucket (e.g., assigned to the next version or the current version). If the client device is not already assigned, then the client device is assigned according to the selection criteria read from a rollout configuration file. If the client device is assigned to the rollout bucket, then the origin request lambda function retrieves the rollout version of the asset from the origin. If the client device is assigned to the current bucket, then the origin request lambda function retrieves the current version of the asset from the bucket.

Figure 3:
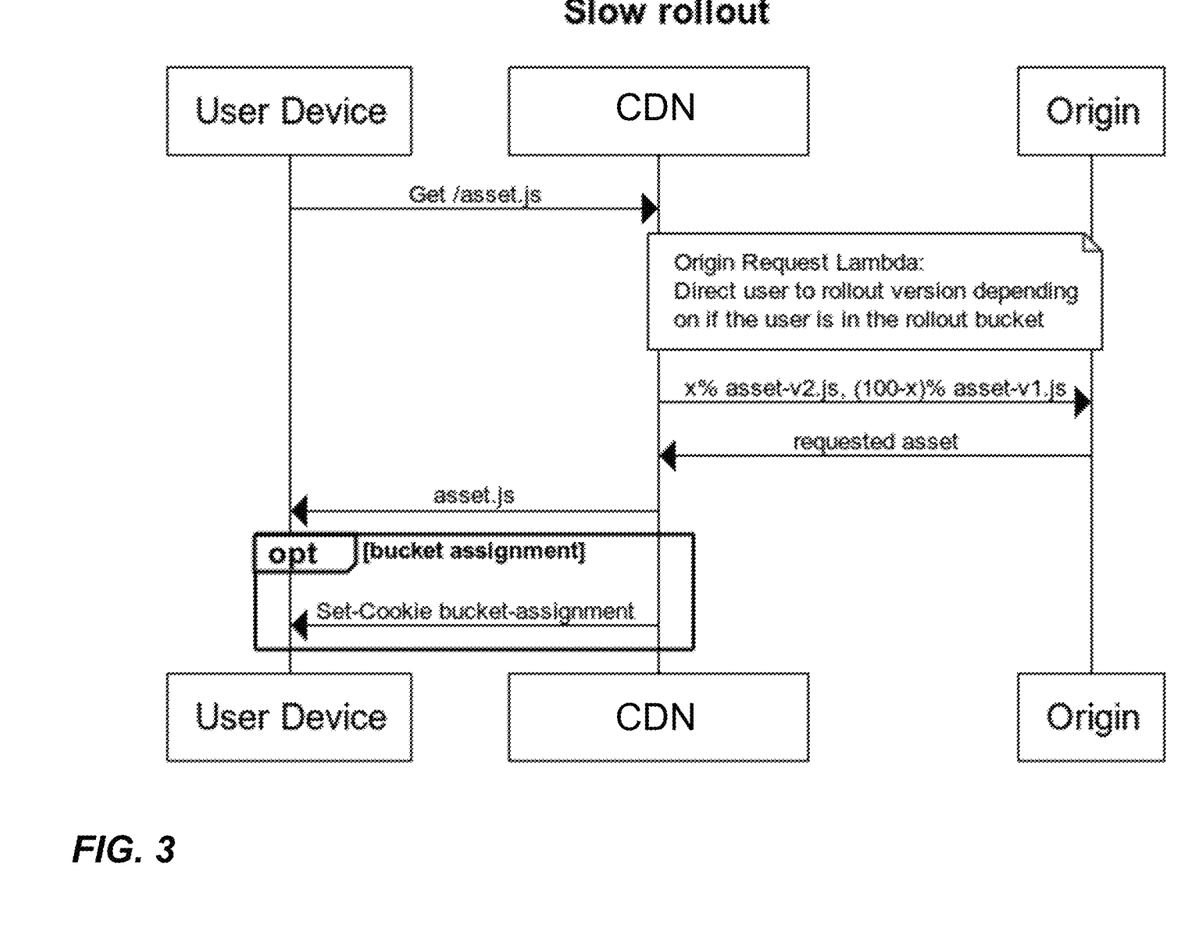
FIG. 3 illustrates a sequence diagram showing a controlled rollout workflow according to embodiments disclosed herein.

FIG. 3 illustrates a workflow for controlled or "slow" rollouts for an asset "asset.js". A percentage of requests for asset.js will be directed to the "v2" version according to the techniques described herein. The remaining percentage goes to a "v1" version of the asset. Note that if the user is assigned a bucket, a cookie may be set to note this assignment when returning the asset.

In the case of beta testing, an additional set of conditions may be used to assign a user or client device to a bucket. In particular embodiments, apart from a rollout percentage, the origin request lambda function may consider factors such as request origin and session information to determine if the user or client device belongs to a beta bucket. As an example, any information that is a part of a HTTP GET request sent by browsers can be used to determine if a request is associated with a beta customer. As another example, a query parameter may be appended as part of the request to the asset, such as through a public key. The query parameter can be used to verify that the user is indeed intended to be a part of the beta rollout.

Figure 4:
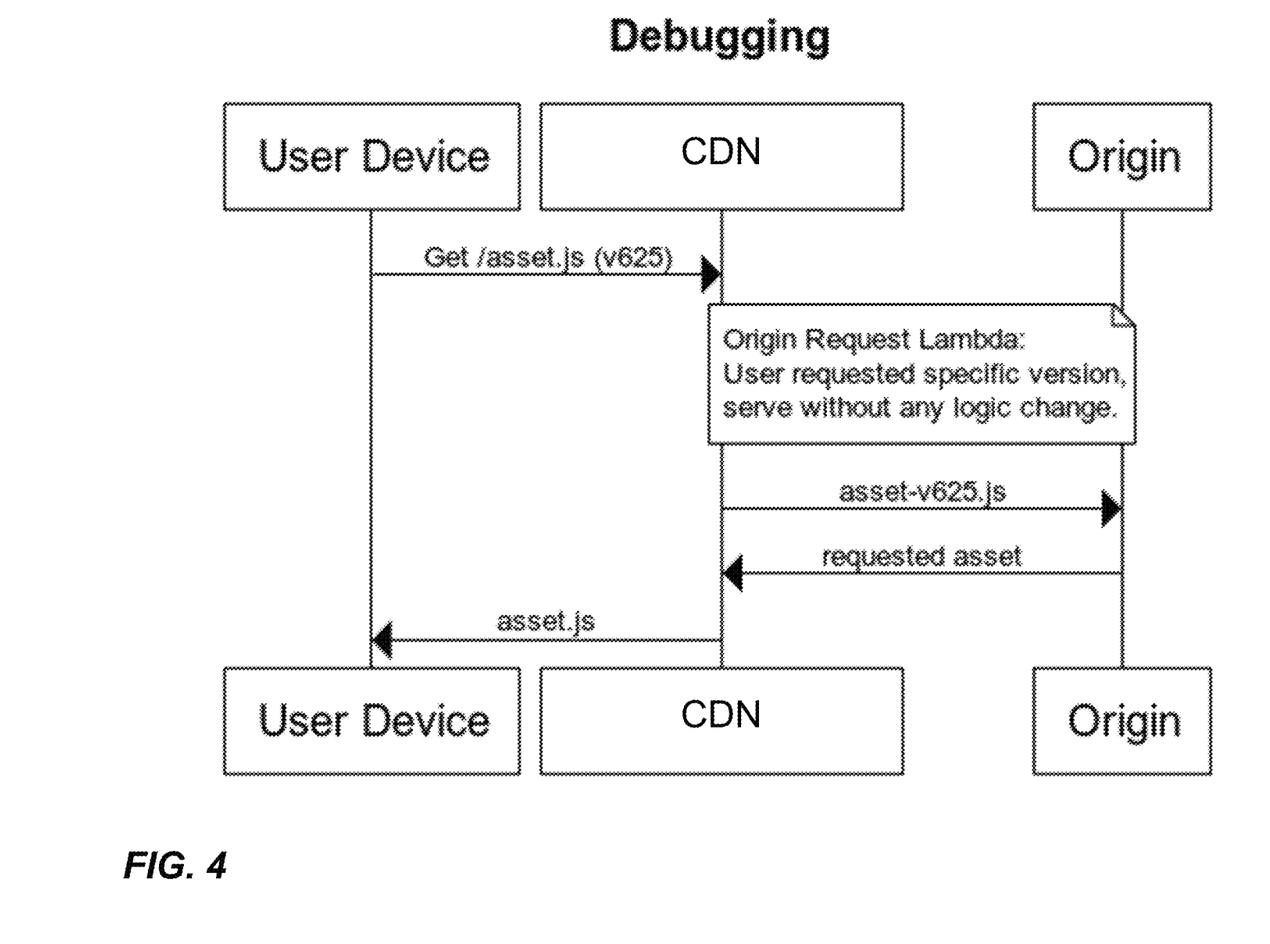
FIG. 4 illustrates a sequence diagram showing a debugging workflow according to embodiments disclosed herein.

In the case of debugging, in particular embodiments, the client device may specify a particular version of the asset to request. For example, the user of the client device may request the specified version to evaluate the asset for debugging purposes. In this case, directing the request as received may help test custom versions of an asset. For example, the user may select particular assets that are causing issues on particular clients (e.g., particular browsers, machine configurations, etc.). The specific version can be set as a custom header (e.g., "x-debug-asset-version"). Additionally, in this way an engineer can deploy a custom version of an asset with extra logging or debugging capabilities and test it in a scenario that is a closer approximation to a live scenario. FIG. 4 illustrates an example showing how debugging requests can be handled.

Particular embodiments may repeat one or more steps of the example process(es), where appropriate. Although this disclosure describes and illustrates particular steps of the example process(es) as occurring in a particular order, this disclosure contemplates any suitable steps of the example process(es) occurring in any suitable order. Moreover, although this disclosure describes and illustrates an example process, this disclosure contemplates any suitable process including any suitable steps, which may include all, some, or none of the steps of the example process(es), where appropriate. Furthermore, although this disclosure describes and illustrates particular components, devices, or systems carrying out particular steps of the example process(es), this disclosure contemplates any suitable combination of any suitable components, devices, or systems carrying out any suitable steps of the example process(es).

Underlying foundational concepts and terms of art relied upon may relate to one or more of the following:

A transaction processing system, such as the "Bolt Platform" consists of four conceptual parts. The frontend that serves both the main consumer checkout flow as well as internal and external dashboards and administrative tools. The core services that power the checkout flow as well as fraud detection and payments. Bolt is architected as a set of independent services which communicate to each other via HyperText Transfer Protocol Representational State Transfer ("HTTP REST") or AWS SIMPLE QUEUE SERVICE ("AWS SQS") messages. The Bolt Application Programming Interface ("Bolt API"), which is the primary means by which merchant systems interface with Bolt, exposed to the outside world via HTTPS REST. Plugins, which are deployed to merchant systems and which connect these systems with the Bolt API.

In all example embodiments described herein, appropriate options, features, and system components may be provided to enable collection, storing, transmission, information security measures (e.g., encryption, authentication/authorization mechanisms), anonymization, pseudonymization, isolation, and aggregation of information in compliance with applicable laws, regulations, and rules. In all example embodiments described herein, appropriate options, features, and system components may be provided to enable protection of privacy for a specific individual, including by way of example and not limitation, generating a report regarding what personal information is being or has been collected and how it is being or will be used, enabling deletion or erasure of any personal information collected, and/or enabling control over the purpose for which any personal information collected is used.

The frontend of the Bolt Platform is stored in a monorepo. It consists of the following sub-components:
 "Connect.js"—renders the Bolt checkout button and bootstrap iframe for checkout
 "checkout"—which is the user-facing component for checkout experience
 "Merchant"—which is the merchant facing dashboard
 "Admin"—which is the internal dashboard used by risk analysts, merchant success, and engineering The core services and the APIs are stored in a monorepo. Examples of services include:
 "API"—which is the set of APIs that power the checkout flow
 "adminapi"—which is the set of APIs that power the admin dashboard.
 "apihooks"—which sends webhook messages to merchant's shopping platforms
 "AsyncJobs"—which is the job framework to handle long-running asynchronous operations
 "Notifier"—which sends notifications such as emails and short message service ("SMS") messages
 "Imageproxy"—which is a lightweight proxy to serve images Backend services may be written in go (with some machine-learning ("ML") logic in python used for risk modeling). Frontend components may be written in React/Typescript. Data may be stored in Postgres, hosted by a relational database service (RDS). Another database used for state management may be Redis.

"Tokenizer" is a completely separate service, available in a serverless way to handle card tokenization. Tokenizer may be maintained completely separate do payment card industry security standards. Tokenizer may be made available in a serverless way, for example, through a service such as AMAZON Lambda. The tokenizer may be implemented in Typescript, powered by a postgres DB. All of the tokenizer infrastructure may be maintained by a separate provider account, with access restricted to a few people.

Below are more details about key services and technology components.

| Service/Component | Purpose/Functionality | Frameworks/Languages |
|---|---|---|
| API | All communication with third-party services, frontend code, business logic | Golang |
| Connect.js and iFrame | Connect.js used for rendering checkout button, the entry point for shoppers. IFrame is how the checkout form is hosted, secure communication with API | React Typescript Webpack |
| Checkout Frontend | Components used to collect customer information during checkout | React Redux Webpack Typescript |
| Notifier | Microservice for enqueueing and sending email and SMS notifications to consumers and merchants. | Golang SQS MAILGUN TWILIO |
| Account.js and iFrame | Used to render the Bolt order tracking button and SSO login/register button, entry point for shoppers. The iFrame is used to display the login/register form as well as the Bolt account dashboard | React Redux Webpack Typescript |
| Consumer Frontend | Components used to display various features such as the Shopper Dashboard and the SSO login flow | React Redux Webpack Typescript |
| Asynchronous jobs | Heavy lifting of job logic to perform tasks like funding, risk review, etc. | Golang Redis Machinery |
| Apihooks (i.e Webhooks) | Microservice for enqueueing and sending webhook events to merchant platforms. | Golang SQS |
| Payment jobs | Scheduler for Asyncjobs framework | Golang Machinery Redis |
| Search | Service to index transactions for merchant dashboard | Golang Elastic Search |
| Tokenizer | PCI compliant serverless lambda to store credit card information. Used to proxy information to 3rd parties | Node.js AWS Lambda AWS Key Management Service ("KWS") AWS RDS |
| Gatekeeper/A/B experimentation | Experimentation and feature rollout platform | Typescript AWS Simple Storage Service ("S3") AWS CLOUDFRONT |
| Sleet | Provides a standardized wrapper for implementing many payment processor gateways. | Golang |
| Risk pipeline | Modeling training and model serving | Golang Python SAGEMAKER |
| Track.js and iFrame | Used to track customer behavior when they land on a merchant's page. Used for risk signals | Typescript React |
| Ledger | Double write bookkeeping service for funds. Tracks money movements through the system | Golang |
| Chargeback management | Automated system to pull chargeback information from various payment processors and display to merchants in the merchant dashboard chargeback portal | Golang React Typescript |

-continued

| Service/Component | Purpose/Functionality | Frameworks/Languages |
|---|---|---|
| Reporting and Reconciliation | Reports pulled from Vantiv and asyncjobs with the ledger to ensure fee collection | Golang Asyncjobs AWS S3 |
| Merchant Dashboard | Centralized dashboard for all actions and reporting related to a merchant's management of their Bolt system. | GraphQL React Typescript |
| Admin Dashboard | Centralized dashboard for all internal actions related to managing Bolt merchants. | GraphQL React JavaScript |
| Admin API | API for actions done by Bolt internal employees (onboarding merchants, turning on features) and majority of use is for risk review | Goland GraphQL |

Integration with ecommerce platforms is supported in two ways. First, directly via the API. Second, with plugins deployed to the host instance.

Database: Data may be stored in highly available postgres databases backed by AWS RDS. Databases can scale their components within available limits for disk (e.g., up to 16 TB), CPU/ram/network (e.g., db.xle.32xlarge which is up to 64 CPU and 3,904 TB RAM).

Messaging: Both Consumer and Merchant-facing components do messaging through a Notifier Service.

Data Access: Services may communicate via REST. GraphQL may be used for all non-external endpoints.

Data Warehouse: A cloud data warehousing service may service as the main data warehouse that stores the refined data. AMAZON ELASTIC MAPREDUCE may be used for extract, transform, load ("ETL") workflows and general analysis of the raw data. AWS Step functions, triggered by a cloud watch event, and AWS Lambda may be used to run the ETL workflows. Results may be loaded into the data warehouse. Code such as ETL scripts may be separately managed. Data consumers (e.g. analysts who look at checkout events) use may use plugins to run queries.

Hosting model: The systems may run on highly available containerized backend services backed, for example, by DOCKER and KUBERNETES on AWS. The backend services may be scaled up/down with zero downtime. Infrastructure for serving the frontend code is highly available and backed by AWS. Frontend serving automatically scales with traffic load.

Logging: Frontend (Bolt checkout modal) logs are sent to an error monitoring and reporting tool. All backend applications (e.g., API, paymentjobs, asyncjobs, notifier, etc.) and infrastructure logs (e.g., KUBERNETES, AWS) are sent to a cloud monitoring platform. Logs may be archived for long-term storage.

Monitoring: High and low level monitors exist to notify engineers of issues. Monitors are replicated to non-production environments to ensure issues can be caught before they make it to production. Monitors are managed in code to ensure consistency and to track changes. Overall application service-level agreements (SLAs) are measured, and lower level monitoring of metrics and logs may be performed using a cloud monitoring platform.

Figure 5:
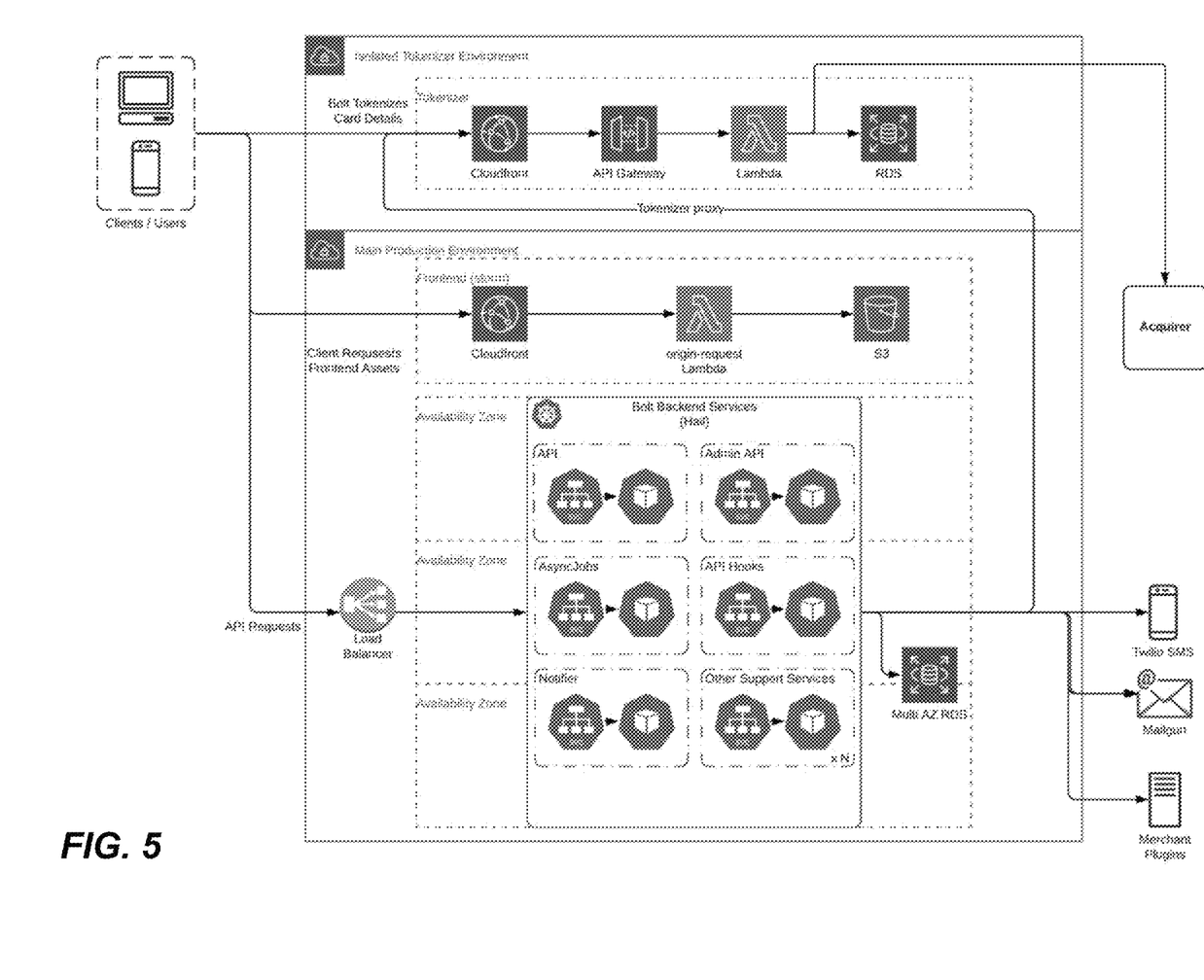
FIG. 5 illustrates an example architecture of a platform according to embodiments disclosed herein.

FIG. 5 highlights the physical architecture of the platform.

Figure 6:
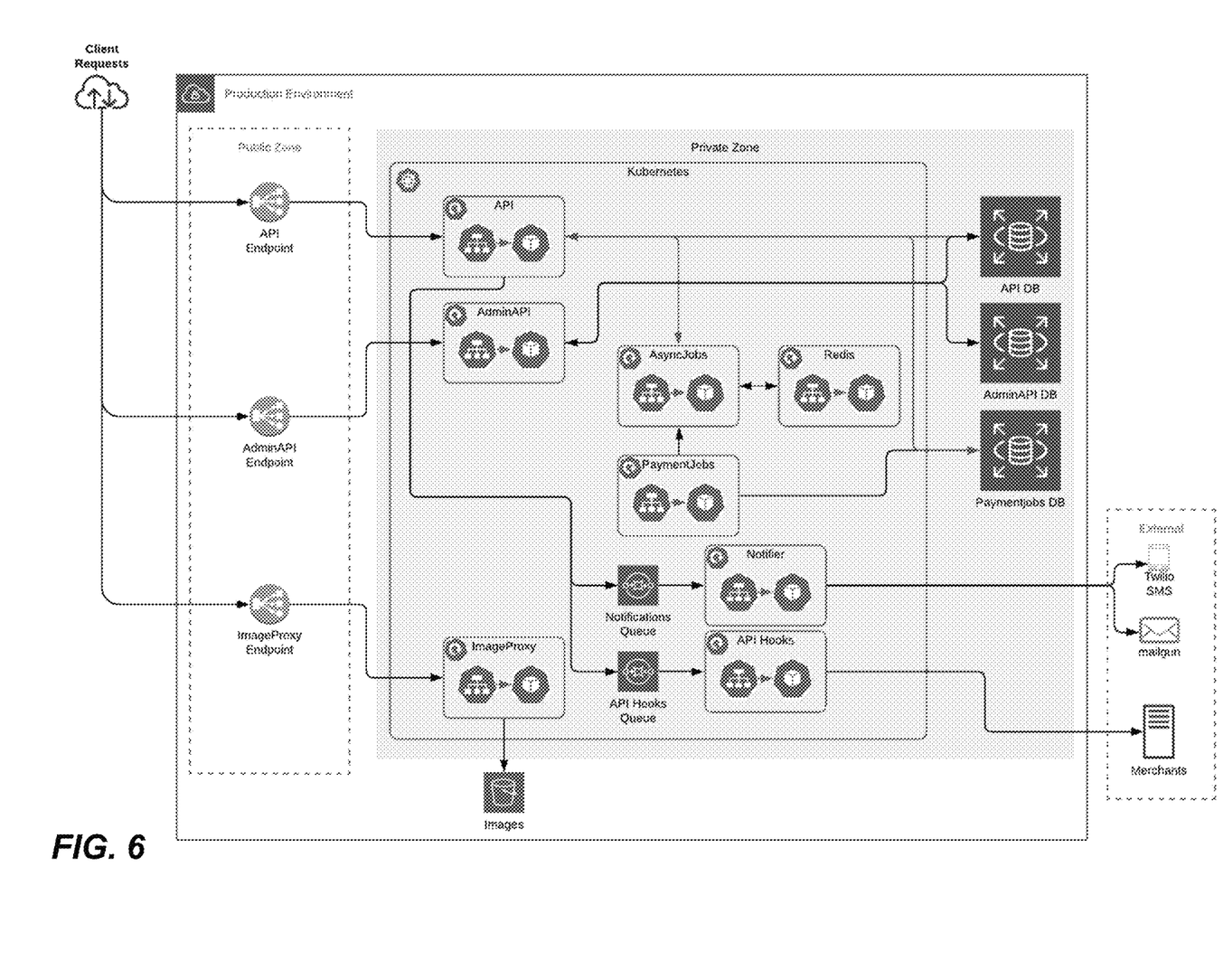
FIG. 6 illustrates an example architecture of a platform according to embodiments disclosed herein.

FIG. 6 shows an alternate visualization of the platform, focusing on backend services.

Figure 7:
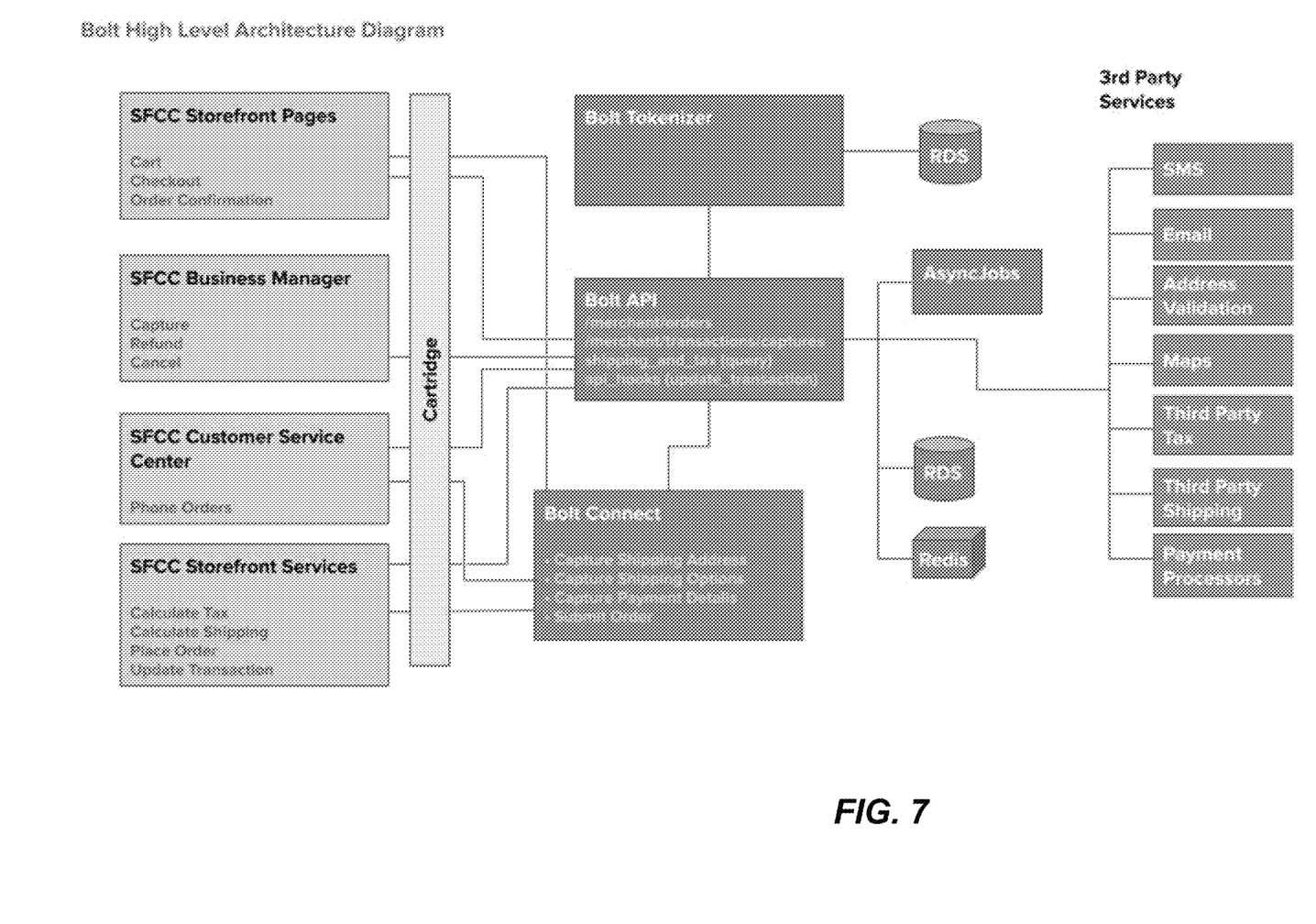
FIG. 7 illustrates example integrations with third party platforms.

FIG. 7 is helpful in understanding how the platform connects with a third party ecommerce platform.

Figure 8:
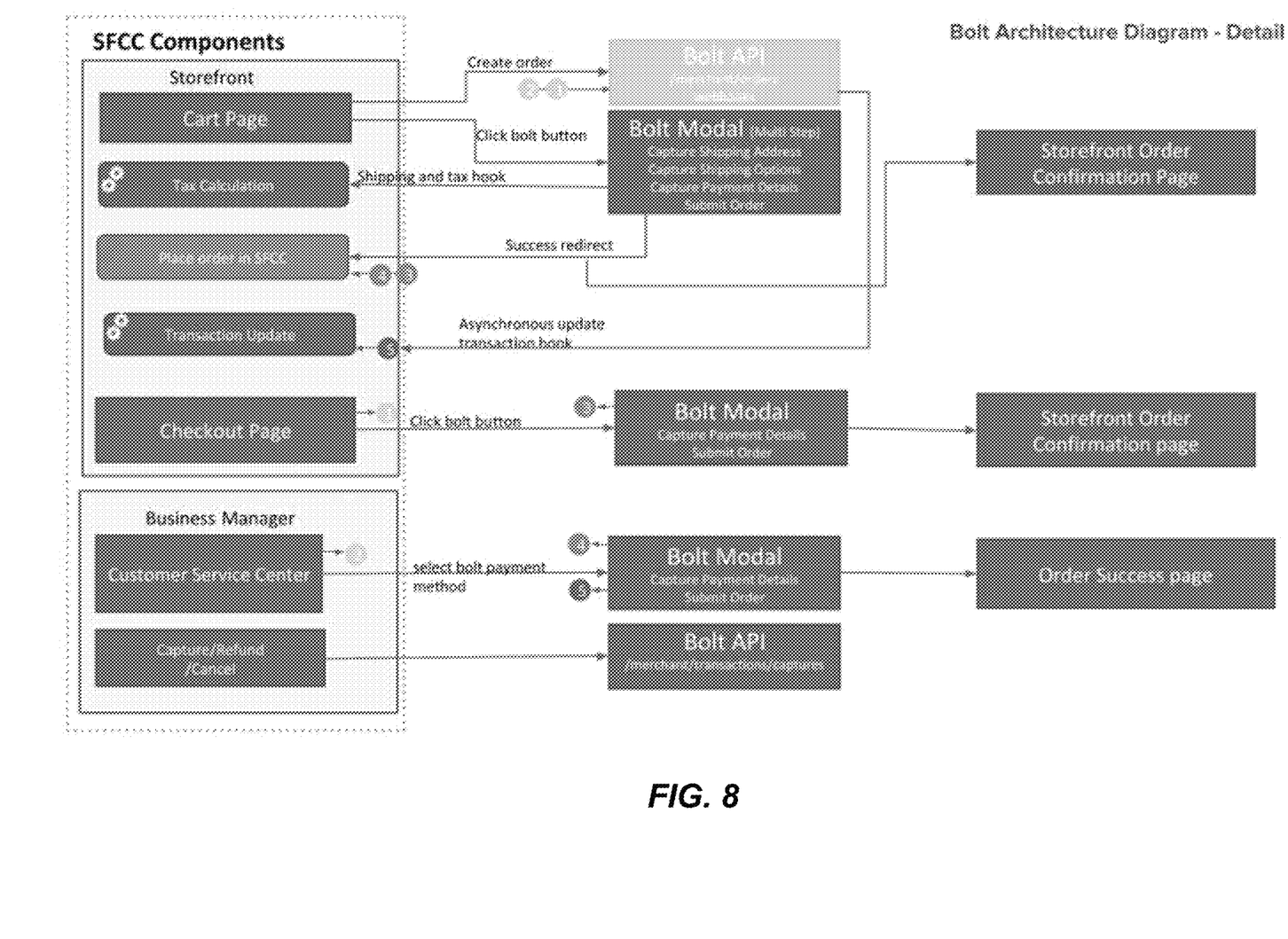
FIG. 8 illustrates example information flows between the platform and a third party platform.

FIG. 8 dives a layer deeper and illustrates the information flows between the platform and a third party platform.

Figure 9:
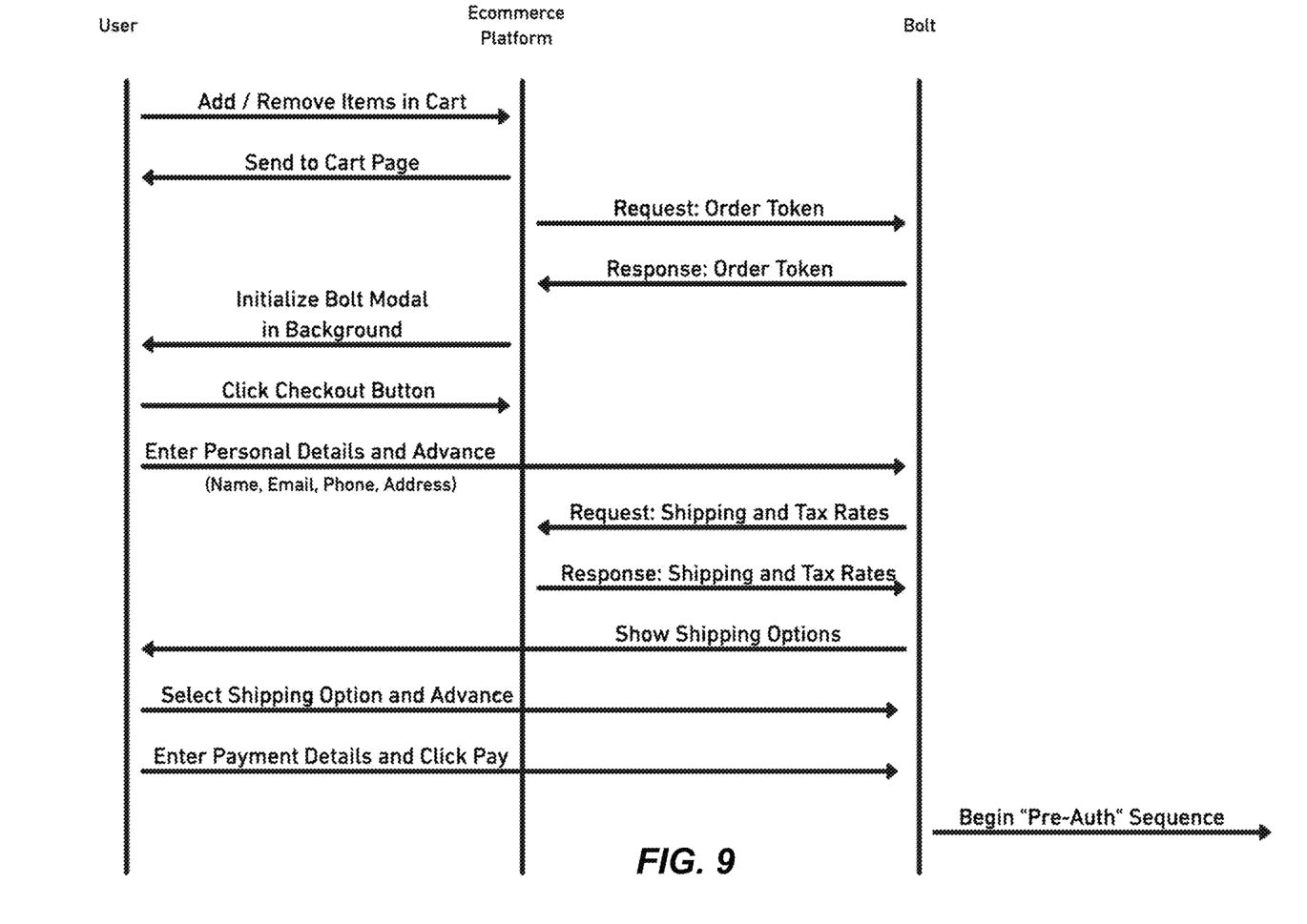
FIG. 9 illustrates the lifecycle of a purchase order.

FIG. 9 illustrates the lifecycle of a purchase order.

In all example embodiments described herein, appropriate options, features, and system components may be provided to enable collection, storing, transmission, information security measures (e.g., encryption, authentication/authorization mechanisms), anonymization, pseudonymization, isolation, and aggregation of information in compliance with applicable laws, regulations, and rules. In all example embodiments described herein, appropriate options, features, and system components may be provided to enable protection of privacy for a specific individual, including by way of example and not limitation, generating a report regarding what personal information is being or has been collected and how it is being or will be used, enabling deletion or erasure of any personal information collected, and/or enabling control over the purpose for which any personal information collected is used.

Figure 10:
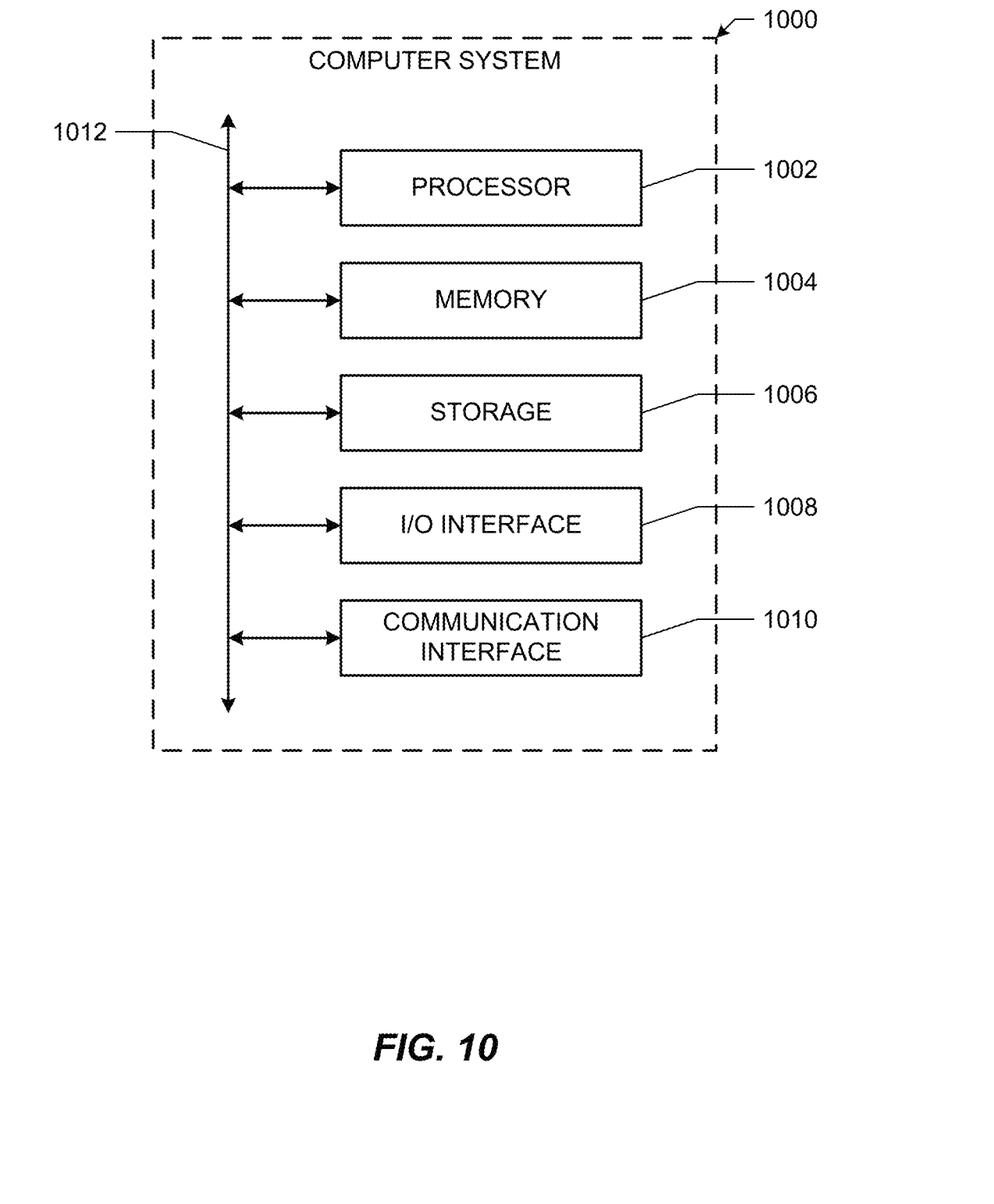
FIG. 10 illustrates an example computer system

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, any reference herein to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for providing assets from an asset origin to a plurality of client devices comprising:

receiving, by a computing system, a request to access a frontend asset from a first client device of the plurality of client devices, the request comprising encrypted additional information associated with the frontend asset that is used by the computing system to verify an identity of a user associated with the client device;

determining, by the computing system, an asset selection criteria;

assigning a bucket among one or more buckets associated with the frontend asset to the first client device based on a random number, the asset selection criteria, and the encrypted additional information associated with the frontend asset;

modifying, by the computing system through a dynamic function based on the bucket assigned to the first client device, a request for the asset origin to select a particular asset from a plurality of assets that are responsive to the request to access the frontend asset;

causing, by the computing system, the asset origin to provide the particular asset to the first client device by providing the modified request to the asset origin; and providing, by the computing system, to the first client device, a device cookie that comprises an expiration parameter indicating when an assignment between the bucket and the first client device is to expire.

2. The method of claim 1, wherein the device cookie indicates the asset selection criteria used to modify the request for the asset origin to select the particular asset.

3. The method of claim 2, further comprising:
receiving, by the computing system, a second request to access the frontend asset from the first client device;
determining, by the computing system based on the device cookie, that the particular asset should be provided to the first client device; and
modifying, by the computing system through the dynamic function, the second request to access the frontend asset to select the particular asset from the plurality of assets that are responsive to the request to access the frontend asset.

4. The method of claim 1, wherein the asset selection criteria indicates that a first subset of the plurality of client devices are to receive a first asset of the plurality of assets as the particular asset and that a second subset of the plurality of client devices are to receive a second asset of the plurality of assets as the particular asset; and
wherein modifying the request for the asset origin to select the particular asset comprises randomly assigning, by the computing system through the dynamic function, the first client device to the first subset or the second subset.

5. The method of claim 4, wherein the first subset is defined by a first percentage of the plurality of client devices and the second subset is defined by a second percentage of the plurality of client devices.

6. The method of claim 5, wherein the first percentage increases over time.

7. The method of claim 1, wherein modifying the request for the asset origin to select the particular asset comprises determining, by the computing system and based on the asset selection criteria, that the first client device is approved to receive beta versions of requested frontend assets, wherein the particular asset selected from the plurality of assets corresponds to a beta version of the frontend asset of the request.

8. The method of claim 1, wherein the request to access the frontend asset comprises a parameter indicating that the first client device is a developer client device and a selected asset from the plurality of assets; and
wherein modifying the request for the asset origin to select the particular asset comprises indicating, by the computing system, the selected asset as the particular asset to be requested.

9. The method of claim 1, wherein the plurality of assets that are responsive to the request to access the frontend asset are a plurality of versions, respectively, of the frontend asset.

10. The method of claim 1, wherein the computing system is associated with a transaction processing system.

11. One or more computer-readable non-transitory storage media including instructions that, when executed by one or more processors of a computing system, are configured to cause the one or more processors to perform operations comprising:
receiving, by the computing system, a request to access a frontend asset from a first client device of a plurality of client devices, the request comprising encrypted additional information associated with the frontend asset that is used by the computing system to verify an identity of a user associated with the client device;
determining, by the computing system, an asset selection criteria;
assigning a bucket among one or more buckets associated with the frontend asset to the first client device based on a random number, the asset selection criteria, and the encrypted additional information associated with the frontend asset;
modifying, by the computing system through a dynamic function based on the bucket assigned to the first client device, a request for an asset origin to select a particular asset from a plurality of assets that are responsive to the request to access the frontend asset;
causing, by the computing system, the asset origin to provide the particular asset to the first client device by providing the modified request to the asset origin; and
providing, by the computing system, to the first client device, a device cookie that comprises an expiration parameter indicating when an assignment between the bucket and the first client device is to expire.

12. The one or more computer-readable non-transitory storage media of claim 11, wherein the device cookie indicates the asset selection criteria used to modify the request for the asset origin to select the particular asset.

13. The one or more computer-readable non-transitory storage media of claim 12, wherein the instructions are further configured to cause the one or more processors of the computing system to perform further operations comprising:
receiving, by the computing system, a second request to access the frontend asset from the first client device;
determining, by the computing system based on the device cookie, that the particular asset should be provided to the first client device; and
modifying, by the computing system through the dynamic function, the second request to access the frontend asset to select the particular asset from the plurality of assets that are responsive to the request to access the frontend asset.

14. The one or more computer-readable non-transitory storage media of claim 11, wherein the asset selection criteria indicates that a first subset of the plurality of client devices are to receive a first asset of the plurality of assets as the particular asset and that a second subset of the plurality of client devices are to receive a second asset of the plurality of assets as the particular asset; and
wherein the instructions to cause the one or more processors of the computing system to modify the request for the asset origin to select the particular asset are further configured to cause the one or more processors of the computing system to perform further operations comprising randomly assigning, by the computing system through the dynamic function, the first client device to the first subset or the second subset.

15. The one or more computer-readable non-transitory storage media of claim 14, wherein the first subset is defined by a first percentage of the plurality of client devices and the second subset is defined by a second percentage of the plurality of client devices.

16. A computing system comprising: one or more processors; and one or more computer-readable non-transitory storage media in communication with the one or more processors and comprising instructions that, when executed by the one or more of the processors, are configured to cause the computing system to perform operations comprising:
receiving, by the computing system, a request to access a frontend asset from a first client device of a plurality of client devices, the request comprising encrypted additional information associated with the frontend asset that is used by the computing system to verify an identity of a user associated with the client device;
determining, by the computing system, an asset selection criteria;

assigning a bucket among one or more buckets associated with the frontend asset to the first client device based on a random number, the asset selection criteria, and the encrypted additional information associated with the frontend asset;

modifying, by the computing system through a dynamic function based on the bucket assigned to the first client device, a request for an asset origin to select a particular asset from a plurality of assets that are responsive to the request to access the frontend asset;

causing, by the computing system, the asset origin to provide the particular asset to the first client device by providing the modified request to the asset origin; and providing, by the computing system, to the first client device, a device cookie that comprises an expiration parameter indicating when an assignment between the bucket and the first client device is to expire.

17. The computing system of claim 16, wherein the device cookie indicates the asset selection criteria used to modify the request for the asset origin to select the particular asset.

18. The computing system of claim 17, wherein the instructions are further configured to cause the computing system to perform further operations comprising:

receiving, by the computing system, a second request to access the frontend asset from the first client device;

determining, by the computing system based on the device cookie, that the particular asset should be provided to the first client device; and modifying, by the computing system through the dynamic function, the second request to access the frontend asset to select the particular asset from the plurality of assets that are responsive to the request to access the frontend asset.

19. The computing system of claim 16, wherein the asset selection criteria indicates that a first subset of the plurality of client devices are to receive a first asset of the plurality of assets as the particular asset and that a second subset of the plurality of client devices are to receive a second asset of the plurality of assets as the particular asset; and wherein the instructions configured to cause the computing system to modify the request for the asset origin to select the particular asset are further configured to cause the computing system to perform further operations comprising randomly assigning, by the computing system through the dynamic function, the first client device to the first subset or the second subset.

20. The computing system of claim 19, wherein the first subset is defined by a first percentage of the plurality of client devices and the second subset is defined by a second percentage of the plurality of client devices.

* * * * *